E. W. JANSEN & J. WATTMANN.
RAIL JOINT.
APPLICATION FILED MAY 15, 1917.
1,266,597.
Patented May 21, 1918.
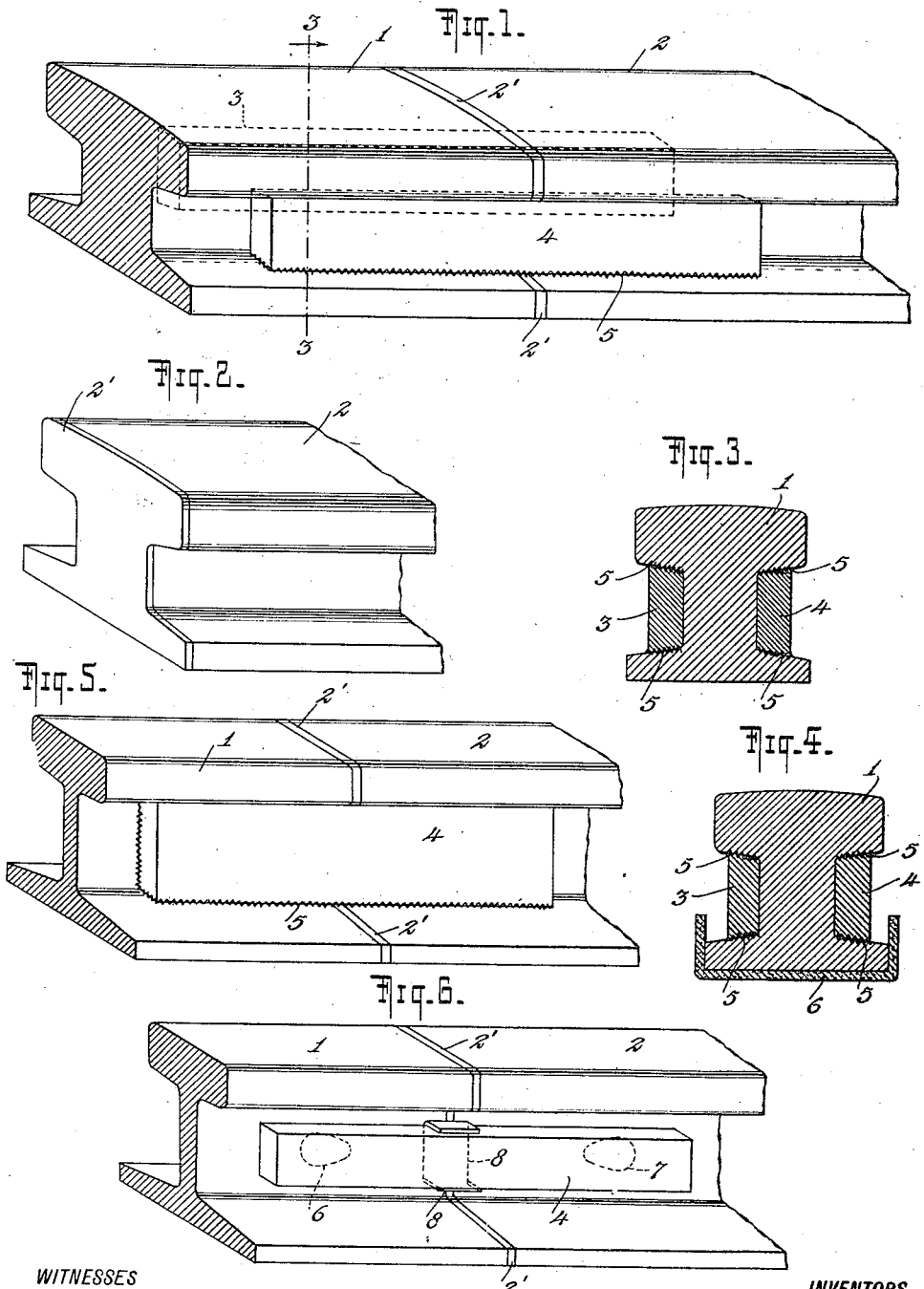
WITNESSES
INVENTORS
EDWARD W. JANSEN
JOHN WATTMANN
ATTORNEYS

UNITED STATES PATENT OFFICE.

EDWARD W. JANSEN, OF NEW YORK, N. Y., AND JOHN WATTMANN, OF TREPTOW, NEAR BERLIN, GERMANY, ASSIGNORS TO ATLANTIC WELDING CORPORATION, OF NEW YORK, N. Y., A CORPORATION OF NEW YORK.

RAIL-JOINT.

1,266,597.

Specification of Letters Patent. Patented May 21, 1918.

Application filed May 15, 1917. Serial No. 168,650.

*To all whom it may concern:*

Be it known that we, EDWARD W. JANSEN and JOHN WATTMANN, respectively a citizen of the United States, residing in the city, county, and State of New York, and a subject of the German Emperor, residing at Treptow, near Berlin, Germany, have invented certain new and useful Improvements in Rail-Joints, of which the following is a specification.

Our invention relates to rail joints for electric railways and for railways generally where it is desirable that the joint shall have an electrical conductivity approximating that of the rail itself.

Our improved rail joint is particularly adapted for use in electrical railway systems in the construction of what is known as the third rail.

Our improved rail joint can also be used to advantage in track construction of electric railway or other systems where high conductivity is desired.

Various forms of welded joints have been proposed for use in the construction of railway tracks or in the construction of the third rail but none have been entirely satisfactory. Such joints have been mechanically weak or of uncertain or impermanent electrical conductivity. Sometimes all of these defects have existed simultaneously and all such joints have required considerable time, labor and expense to install.

So-called mechanical joints comprising rail ends united together by fish plates bolted or riveted thereto have suffered from a liability to loosen up by reason of the strains and vibrations of traffic and have, furthermore, necessitated extra copper bonds between the rail ends in order to obtain the necessary conductivity.

It is the object of the present invention to provide an improved rail joint which shall avoid the above mentioned disadvantages and shall have sufficient and permanent mechanical strength as well as a conductivity approximating that of the rail itself. Indeed, according to our invention, the joint may well have a conductivity even higher than that of the rail itself.

Another object of our invention is to provide a rail joint which, as contrasted with the usual plain butt-welded joints, shall avoid loss of conductivity between the rail ends due to irregularities of, or lack of parallelism between, their abutting surfaces.

Briefly described, our improved joint comprises two abutting rail ends held together by one or more plates welded (or otherwise firmly attached) thereto and having a zinc, tin, lead or equivalent "shim" between the rail ends, the plates being welded along their top and bottom edges to the sides of the rails, or around their entire periphery; or partially along the top and bottom; or any other preferred points upon the plates may be selected for the purpose of making the welding attachment.

In welding the plates to the rail ends, what is known as the automatic arc type of welding is preferred, but any other method of welding either by a metallic arc, a carbon arc or gas may be used if desired; or the resistance method of welding may be employed.

The plates which are welded to the rail ends and which connect said ends together are preferably of soft steel but may consist of refined iron, copper, high carbon steel or any other metal having reasonably good electrical conductivity. Where copper is used for connecting plates the mechanical strength of the joint will not be as great as if iron or steel were used but would still be amply sufficient for third rail purposes.

Our invention will be better understood by referring to the accompanying drawings in which Figure 1 represents a perspective of a pair of rail ends united by our improved joint; Fig. 2 represents one of the rail ends of Fig. 1 showing the coating of high conductivity metal thereon; Fig. 3 represents a section taken along the line 3—3 of Fig. 1; Fig. 4 represents a section, similar to Fig. 3, but showing the use of an asbestos dam for preventing loss of the high conductivity metal; Fig. 5 represents a perspective, similar to Fig. 1, showing our improved joint when all peripheral edges of the plate are welded to the rail ends; and Fig. 6 shows a view, similar to Fig. 1, of a modified form of our joint in which the plates are spot-welded at each end, and are also spot-welded centrally to the interposed shim.

In making our improved joint, and referring to Figs. 1 to 3 inclusive, the opposed faces of the two rail ends, 1, 2, are first squared off perpendicularly to the length of the rails. This squaring off need not be done with any great accuracy and will be sufficiently good if the surfaces are substantially flat and substantially at right angles to the rails. Each of the opposed surfaces of the two rail ends is then coated with a layer 2' of tin (zinc, lead or other equivalent material may be substituted), preferably by melting the same and then spraying it upon the rail end surface while in molten condition. This is easily accomplished by the now well known Schoop process. The spraying should be continued until the thickness of metal is from a thirty-second to a sixteenth of an inch thick. If this spraying has been done with reasonable care the surfaces will still be sufficiently flat to require no further treatment. If, however, the spraying has produced marked surface irregularities, these may be dressed down roughly with a file. Examination will show that the union between the sprayed metal and the surface of the rail end is molecular.

Before the metal is sprayed upon the rail end surface the latter must be clean and bright. If these ends have been freshly squared this will be sufficient, but if they have had time to oxidize they must be cleaned by sand blast, filing or other suitable means. The two rail ends are then abutted together and plates 3, 4 placed upon the two sides of the rails so as to span the joint. These plates may then be welded along their top and bottom edges 5 to the rail ends in the usual way. The heat of welding will be sufficient to again raise the tin to the melting point so that the two tinned surfaces will unite together. As the joint cools down the plates, 3, 4, will contract and draw the two rail ends very forcibly together thus forcing the tin into the pores of the rails and compressing and densifying it. This same pressure will cause the tin 2' to flow and fill the entire space between the ends of the rails proper whether this space be of uniform thickness or of irregular thickness due to original inaccurate squaring off of the rail ends.

It may be desirable in some cases to arrange a dam of asbestos 6 under the rail ends at the joint, the ends of the dam coming up on each side above the foot of the rail, so as to prevent the molten tin or other coating material which has been used from flowing away.

Fig. 5 shows a modification of our invention, similar to Fig. 1 in every respect, except that each plate is welded to the rail ends around all its edges. Here the rail shown is a track rail of usual T section instead of a third rail (conductor rail).

Fig. 6 shows another modification of our invention, also in connection with a T rail. Here the plates are not welded to the rail ends at their edges but are spot-welded on their inner surfaces at each end and also at the center. In this construction of the joint it is best to provide each plate with bosses on the inner end surfaces as indicated in dotted lines 6, 7. A boss could, similarly, be employed at the center but we prefer a U-shaped yoke 8 which passes around to the rear of the plates which are to be welded to the rails. The weld itself had best be effected by the resistance method by pressing the plates against the sides of the rails. In this form of the invention the central boss or yoke 8 will be welded not only to each rail end but also to the metal shim 2' between said ends. In the practice of this form of the invention by the resistance method of welding the plates may be pressed against the rails so powerfully that the end bosses and the central boss or yoke will sink into the body of the rails so as to leave the entire lateral surface at rest against the side of the rail.

Instead of using a metal of low melting point between the rail ends we may use a metal of much higher melting point like copper. In such case the metal may be melted and spread upon the ends proper of the rails as above described, or we may cut sheet copper of suitable thickness to a shape roughly corresponding with that of the cross section of the rail and interpose it between the rail ends. The connecting plates are then welded fast to the side of the rail ends as before. As these connecting plates contract, the rail ends will be powerfully drawn together thus compressing the copper sheet and causing it to flow so as to completely fill the entire space between the rail ends.

Instead of relying upon the pressure produced by the contracting connecting plates to cause the metal to flow so as to fill the space between the rail ends we may, within the scope of our invention, forcibly compress the rail ends together by any suitable mechanical means. This pressure will cause the interposed metal to flow into and fill the entire space between the rail ends. The rail ends can now be permanently locked together in this established relation either by welding the connecting plates to their sides as above described or by suitably riveting or bolting connecting plates to the two sides.

Having described our invention, we claim:

1. A rail joint of high conductivity comprising a pair of rail ends separated by but in close contact with a shim of good conductivity metal, said shim being in a state of compression, and means constituting part of the joint for holding said ends and shim in fixed position.

2. A rail joint of high conductivity comprising a pair of rail ends separated by but in close contact with a shim of good conductivity metal, said shim being in a state of compression, and a pair of plates on opposite sides of the rail ends and attached thereto for holding them together.

3. A rail joint of high conductivity comprising a pair of rail ends, a metal shim between said ends, and a pair of plates, one on each side of the rail ends, each plate being welded to each rail end and the rail ends being in a state of mutual compression.

In testimony whereof we have hereunto set our hands.

EDWARD W. JANSEN.
JOHN WATTMANN.